United States Patent [19]

Naumec et al.

[11] Patent Number: 4,632,623
[45] Date of Patent: Dec. 30, 1986

[54] WORKPIECE MANIPULATOR FOR A HOT ENVIRONMENT

[75] Inventors: John R. Naumec, Willimantic, Conn.; Peter H. Kaverud, Columbus, Ga.

[73] Assignee: United Technologies Corporation, Hartford, Conn.

[21] Appl. No.: 660,751

[22] Filed: Oct. 15, 1984

[51] Int. Cl.$^4$ .............................................. B25J 15/02
[52] U.S. Cl. .................................. 414/148; 116/277; 294/103.1; 294/907; 414/161; 414/186; 414/730; 414/786; 901/45
[58] Field of Search ............... 414/161, 186, 730, 786, 414/148, 172, 180, 191, 17; 901/45; 116/209, 273, 277; 294/103.1, 907

[56] References Cited

U.S. PATENT DOCUMENTS

| 2,368,615 | 2/1945 | Reese | 414/186 |
| 4,129,220 | 12/1978 | Peterson et al. | 414/17 |
| 4,352,618 | 10/1982 | Flockenhaus et al. | 414/161 X |

FOREIGN PATENT DOCUMENTS 617257 7/1978 U.S.S.R. .

OTHER PUBLICATIONS

R. L. Garrison et al., "Pneumatic Touch Sensor" IBM Technical Disclosure Bulletin vol. 16, No. 6, Nov. 1973, pp. 2037-2040.

Primary Examiner—Joseph L. Valenza
Assistant Examiner—David A. Bucci
Attorney, Agent, or Firm—C. G. Nessler

[57] ABSTRACT

A manipulator for a workpiece, useful in conjuction with a robot, is especially designed for handling forging preforms in a hot furnace. A fluidic type sensor is used to position the structure above a furnace surface on which the preform rests. Air continuously flows through the sensor to cool the sensor and parts of the manipulator, discharging toward the furnace floor near the workpiece. Thus, even though the absolute position and texture of the furnace surface may vary, the manipulator will always grip the workpiece at the same location relative to the surface.

9 Claims, 4 Drawing Figures

WORKPIECE MANIPULATOR FOR A HOT ENVIRONMENT

TECHNICAL FIELD

The present invention relates to the precise and automatic manipulation of workpieces in high temperature environments, most particularly to a robot manipulator arm having a pneumatic sensor for detecting the furnace floor on which a workpiece rests.

BACKGROUND

The problem which led to the present invention involves the movement of workpieces in connection with a forging operation. As is common, workpieces are heated to an elevated temperature prior to forging, most commonly by being placed in a furnace. Once the article is heated to an elevated temperature, it must be rapidly removed from the furnace and placed within the forging apparatus, so it can be worked in the desired manner. It is important that the article be moved quickly and accurately to the forging position. It has been found that this job is particularly suited to a robot manipulator, not least of all because it can be a hot and unpleasant job.

While robots can be regularly programmed to accurately perform such functions there is a problem if the workpiece is not in the position at which the robot is told by its program that it is supposed to be. Furthermore, with relatively small workpieces it is critical that the workpieces be accurately held, so they are accurately forged. Because of the high temperatures involved, certain problems can arise in handling small forging preforms. These include changes in the absolute position of the working surface of the furnace due to distortion with change in temperature or wear, and distortion of the robot arm due to the effects of heat.

Also, when forgings are made of titanium and other reactive metals, the workpiece is often coated with glass and other material to protect it from oxidation. Therefore, while it may seem appropriate to have the robot arm detect the workpiece position by contacting or sensing the workpiece itself, it can be difficult to make this practical. Various optical and electrical sensors which might be useful in other circumstances are not particularly suited for the harsh environment which comprises the interior of a furnace, where temperatures can be in the 1100° C. range or higher.

Also, the glass coating can be adversely affected in its protective function at the location where the robot grips the workpiece. Given this, it is important that the robot accurately and consistently grip a workpiece so that any degraded area will be confined to a non-essential part of the workpiece, typically a portion that is discarded further in the manufacturing process.

There have, of course, been innumerable variations in robot manipulator arms and associated sensors described in the patent and technical literature. But, there are two patents of particular interest to the present invention. The first, USSR Patent Ser. No. 617,257, shows a robot hand clamp for use in manipulating hot workpieces in forging operations. The arm has an electrical sensor which, as indicated above, is prone to degradation in a furnace environment and is not particularly useful when the workpiece is coated with a non-conductive glass coating of uncertain thickness. U.S. Pat. No. 4,129,220 to Peterson et al. shows a bar stock feeding apparatus useful with a metal working machine.

As is revealed in the further description herein, the sensor of the present invention is fluidic. The Peterson patent describes a pneumatic feeding system which includes pneumatic sensors and generally reflects pneumatic sensing and gripping devices. However, the Peterson apparatus is not suited for use at high temperature, owing to the details of its construction which include numerous elastomer seals and close fits.

Therefore, there is a need for a simple and reliable manipulator which will accurately grip workpieces which are positioned in a hot environment on a surface of imprecise location.

DISCLOSURE OF INVENTION

An object of the invention is to provide a manipulator suited for use in high temperature and other environments which are adverse to the operation of conventional proximity detectors, such as electrical and optical detectors. A further object of the invention is to provide a manipulator which is capable of positioning itself relative to the floor of a furnace, where the floor is coarse and uneven in texture.

According to the invention a manipulator apparatus is comprised of a structure for gripping the workpiece and a sensor which operates fluidically, such as a pneumatic sensor. The sensor is connected to a gas flow path and is configured to allow continuous gas flow through the sensor to thereby cool the sensor and any other parts along the gas flow path. Air is most commonly used; in a preferred embodiment. Discharge of the air which cools the sensor is preferably directed toward the workpiece holding surface.

In the preferred embodiment of the invention the sensor has a plunger which extends from the lower surface of the structure which enters the furnace. The plunger contacts the floor of the furnace and is caused to move as the manipulator nears the surface. The motion of the plunger moves a piston and affects the flow path of the gas by restricting it. This changes the flow or pressure in the supply line; and, a signal generated by a suitable supply line detector is used to control the gripping means. The air continuously discharged from the sensor is directed toward the end of the plunger where it contacts the workpiece holding surface. The air flow will tend to keep the plunger cool and to blow away light particulate debris which rests on the workpiece surface. Typically, the plunger and piston fit loosely in the sensor and the flow of air also tends to keep debris from entering the loose fit areas and thus causing mechanical hinderance on the moving parts. Preferably, the flow passages are designed so that the cooling air flows by means of passages, grooves or holes, through the piston and along the plunger. Preferably, the airflow along such passages is increased when the plunger is activated, as this is the condition under which it obtains its maximum thermal load due to proximity to the workpiece surface.

The invention is advantageous in that it is simple in operation and thus quite suited for high temperature operation. The absense of any elastomer seals means that the degree of cooling is not critical to the continued and accurate operation of the unit. The sensor provides accurate information to the manipulator, regardless of variations in the texture and local features of the workpiece holding surface.

BEST MODE FOR CARRYING OUT THE INVENTION

The invention is described in terms of a manipulator of a particular configuration, designed to lift a forging preform from a furnace. However, it will be appreciated that the invention may be made in other configurations and for use in other applications, wherever a workpiece must be manipulated in a high temperature or otherwise adverse environment. In particular, the present invention will be useful in certain hot extrusion processes.

Figure 1:
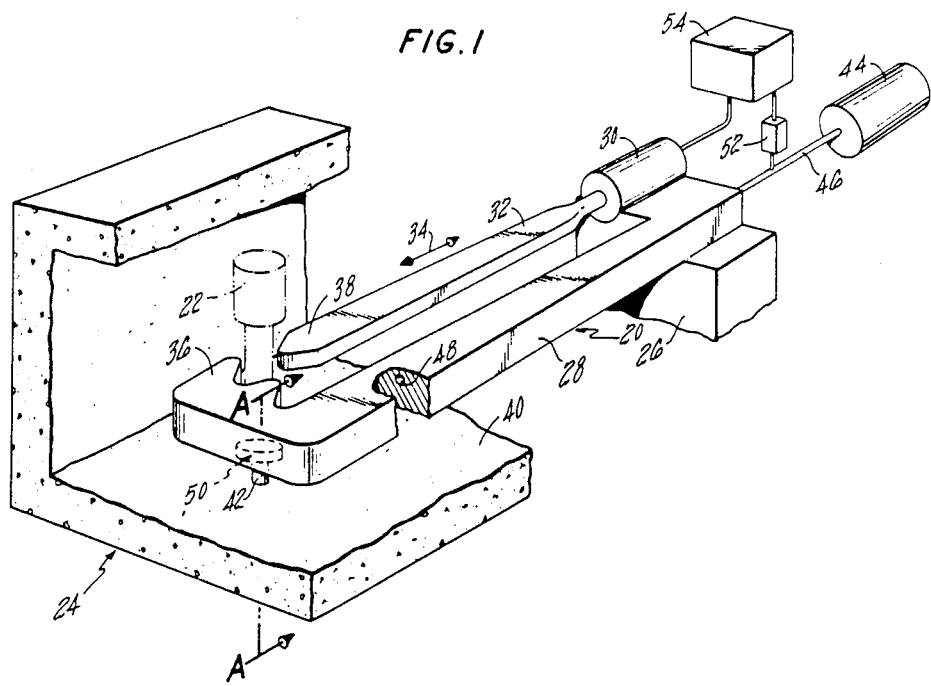
FIG. 1 is a perspective view of a manipulator having a position sensor at its extremity, showing how the manipulator is able to grip a workpiece positioned within a hot furnace.

FIG. 1 shows the essential elements of the invention. The manipulator apparatus 20 is being used to pick up a forging preform workpiece 22, shown in phantom, setting on the interior floor 40 of a hot furnace 24, shown in partial cutaway. The manipulator 20 is supported off a base structure 26 which has a capability for motion in, along and about multiple axes, characteristic of multi-axis motion robots which are well known in commerce.

The manipulator is comprised of an arm 28 which extends lengthwise from the base 26. At the end of the arm is a portion 36 which comprises half of the gripping means 36,34 which is adapted to grab the workpiece. Also, attached to the base and arm is an actuator 30, such as the pneumatic cylinder shown, to which is attached a strut 32 adapted to move parallel to the arm 28, as indicated by the arrow 34. The end 38 of the strut comprises the second half of the gripping means, opposing the end 36 of the arm 28. As will be apparent, when the end 38 is caused to move toward the end 36, the workpiece 22 will be held within the manipulator. In such a position, the arm of the manipulator can be raised vertically and then withdrawn laterally from the furnace and moved elsewhere, whereupon the desired forging operation can be applied to the preform.

As described here the arm 36 is shown to be immovable with respect to the base and the actuator moves toward it. In other applications a somewhat different design has been preferred in that both the actuator and arm move toward a mid point between them. This is carried out by having both of the members slidable and by having them actuated by rotary gear driving racks attached to each member; a cam system may also be used.

The workpiece 22 rests on the furnace floor surface 40 which is made of a refractory. The surface tends to be rough and may have various pieces of particulate debris on it. Inasmuch as it is important to grab the workpiece 22 at a very carefully known location, a position sensor 50 is located in the arm; the plunger part 42 protrudes from the lower surface of the arm 28.

The sensor is of the fluidic type and in this instance is operated by air which, as shown in FIG. 1, emanates from a constant output volume supply 44 and through line 46 is connected to the arm 28. The air flows within the arm through a passage 48 until it reaches the sensor location. In operation, the sensor 50 alters the pressure (or flow) in the lines 48,46 and any change is detected by a detector 52 suitably located along the air supply line. The detector 52 provides a signal to the controller 54, which upon processing the signal and such other signals and commands as are provided, appropriately activates the piston 30 and thereby the gripping means 36,38.

Figures 2, 3, 4:
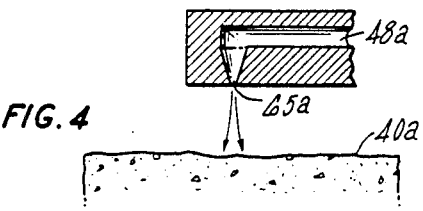
FIGS. 2 and 3 are sectional views along line AA in FIG. 1, showing the configuration of a position sensor. The sensor is shown in the unactivated condition in FIG. 2 and in the activated condition in FIG. 3.
FIG. 4 is a cross section of a simpler sensor which is however not as suited for rough surface measurement as is the sensor shown in the other figures.

FIGS. 2 and 3 show in more detail how the sensor is constructed. In the preferred embodiment the sensor is integrated into the construction of the arm, but it is evident that a separate part may be utilized as well. The supply passage 48 enters a chamber 56 in which is located a piston 58. The piston has a plunger 42 as an integral part thereof and which extends from the lower surface 72 of the arm 28, so that it will first contact any surface upon which the arm is lowered. There is also a smaller channel 68 which exits from the piston chamber 56. The channel 68 can discharge to the atmosphere or be routed back through the arm or such other parts of the structure as may require cooling. Of course, the supply passage 48 may be replaced by an independent pipleline external to the arm for reasons of convenience.

When the piston is in its lowermost position as shown in FIG. 2, any air (indicated by arrows 66) entering through channel 48 can leave the chamber 56 by means of exit channel 68. However, since the channel 68 is made smaller than the channel 48 there is created in the chamber 56 a pressure which is positive with respect to the atmosphere surrounding the arm.

The piston has a multiplicity of passages 60 through which air can bypass the piston. In other embodiments, the piston may have slots around its periphery and underside, to achieve the same purpose. The passages 60 allow air to bypass the piston and, by means of groove passages 64, to travel along the length of the bore 65 in which the plunger slides, so that air is discharged in the direction of the work holding surface 40, owing to the pressure in chamber 56.

The sensor is shown in its actuated position in FIG. 3, where the lower surface 72 of the arm is a distance S from the work holding surface 40, closer than shown in FIG. 2. The end of the plunger 42 has contacted the surface, causing the piston 58 to be moved vertically, thereby blocking the exit channel 68, and reducing the flow of air along the supply channel 48. Cooling air 66' continues to flow through the passages 60,64. But, because of the diminished quantity of flow, the pressure in the channel 48 and in connecting line 46 is raised, inasmuch as the supply 44 is designed to provide a constant volume. The change in flow or pressure is sensed by detector 52, thus signaling the controller 54 that the arm is in position to grip the workpiece.

The piston 58 and the plunger 42 are purposely designed to fit loosely within the chamber 56 and the bore 65 respectively. This is important in view of the probable lack of lubrication and the probable temperature variations amongst and along the various components. Both these factors can cause galling or other interactions which will prevent the piston and plunger from moving freely and carrying out their intended purpose. However, as a result of this looseness there may be a tendency for particles to enter the bore 65 during the use.

As will be appreciated from the foregoing description, when the sensor is in both its activated and unactivated positions, there will be a continuous flow of cooling air through the sensor. This cooling air serves several functions. First, it maintains the sensor (and any parts through which the air travels in reaching or leaving the sensor) at a low temperature. Second, the flow of air along the bore 65, both in the space just described and via the grooves 64 mentioned above, will tend to prevent debris from entering the bore or piston chamber, thereby avoiding any disruptive effects. Third, the flow 62 is directed along the length of the plunger and toward the surface being detected. This flow will cool the plunger to keep it within its useful range and to keep it from unduly changing its dimension. Fourth, the flow of cooling air will have the tendency to sweep away debris, such as particles 70, where they rest on the surface being detected, so that an accurate position measurement is obtained.

How much air flows along the channels and through the piston depends on the weight given to carrying out the aforementioned objects. In the instance described here with respect to the manipulation of a glass coated workpiece, it is undesirable that the air ejected from the sensor blow debris around such that it would tend to blow onto the workpiece. Thus, the velocity impinging on the workpiece is relatively modest to avoid this possible problem. It is nonetheless desirable that the air flow continuously to keep the apparatus cool and to avoid accumulation of debris in the sensor.

When the piston 58 rises and restricts the flow along the passage 68, inasmuch as the total amount of exit area for the air flowing along the path 66, 66' is reduced, the pressure in the supply line will rise. This is also true of course for the pressure immediately above the piston surface. As a result, a greater quantity of air will flow through the passages 60 when the piston is in the activated position, than when the piston is unactivated. This is desirable because under such condition the arm will be in the furnace or other heated working area and this is when the maximum cooling of the plunger 42 is necessary.

The following is a particular example of one practice of the invention. The air is supplied at a pressure of about 7-11 kPa (1.0-1.5 psi) relative to atmosphere. The plunger is about 5 mm diameter and the piston is about 10 mm diameter. When the sensor is unactivated about 10-20 percent of the airflow is through the passageways 60 and the rest is through the channel 68. When the sensor is activated as shown in FIG. 3, about 50 percent of the flow is through the passages 60 and 50 percent is through the channel 68.

While the plunger-activated apparatus is described in terms of a plunger being attached to a piston of a larger diameter, it should be evident that a constant diameter plunger, with the innermost end acting as the piston (together with suitable means for retaining the plunger in the arm) may be employed in carrying out the objects of the invention.

It should be evident that other configurations and degrees of alteration of the air flow through the channel can be utilized, as can other means for detecting the alteration of flow or pressure.

It is within the scope of the invention that the gas flow path may lead to the sensor by any convenient means, including a conduit external to the arm. And while the particular gripping means described herein is a clamp-like device, other gripping means may be as simple as a probe to engage a workpiece receptacle or as complex as a simulative human hand. The structure of the manipulator which is referred to in the claims comprises a part like the movable arm described above, whatever means is used to deliver air to the sensor, and whatever means is needed to integrate into the arm a gripping means.

As another example, FIG. 4 shows another embodiment of the invention wherein the channel 48a simply discharges the air stream through nozzle 65a toward the workpiece surface. As is well known, when a workpiece surface 40 is brought in proximity to the discharge orifice 65a the back pressure in line 48a will vary. However, inasmuch as the character of the workpiece surface 40a can vary in shape and roughness, or in slope, and inasmuch as our experiments have indicated the device shown in FIG. 4 is relatively unpowerful in so far as the back pressure effect produced, especially for large separations S, the configuration shown in FIGS. 1-3 is preferred. The plunger of the preferred embodiment averages the workpiece surface height across its width dimension and is more positive.

Although this invention has been shown and described with respect to detailed embodiments thereof, it will be understood by those skilled in the art that various changes in form and detail thereof may be made without departing from the spirit and scope of the claimed invention.

We claim:

1. A manipulator apparatus useful for gripping a workpiece located on a workpiece holding surface in a high temperature environment comprising:
   a structure having means for gripping the workpiece, and having a gas flow path for carrying gas;
   a sensor attached to the structure for sensing the proximity of the gripping means to the workpiece holding surface; the sensor connected into the gas flow path, allowing continuous flow of gas therealong at all times during use to thereby cool the sensor, and altering the flow of gas according to the proximity of the gripping means to the surface; and a means for detecting a change in the flow or pressure of gas within the flow path due to alteration in the flow path by the sensor, the detector means providing a signal in response thereto; and the gripping means being responsive to the signal provided by the detector means.

2. The apparatus of claim 1 characterized by a sensor comprised of a plunger extending from the structure and moving upon contact with the surface, motion of the plunger affecting the flow path of the gas.

3. The apparatus of claim 2 characterized by a gas flow path shaped to discharge continuously flowing gas along the plunger toward the location where the plunger contacts the workpiece holding surface.

4. The apparatus of claim 3 characterized by a gas flow path which is shaped so that the flow along the plunger increases when the plunger moves upon contact with the surface.

5. The apparatus of claim 2 characterized by a sensor having a chamber along the flow path in which a piston is positioned; a smaller diameter plunger attached to the piston and extending from the chamber and the structure; wherein contact of the plunger with the surface moves the piston and alters the flow path.

6. The apparatus of claim 5 characterized by a piston having flow passages which allow flow continuously through or around the piston regardless of piston position.

7. The method of manipulating an article in a high temperature environment which comprises gripping the article with a releasable manipulator, sensing a surface on which the article is placed with a sensor, and controlling the gripping according to the position of the manipulator with respect to the surface, characterized by continuously flowing air through the manipulator and along a gas flow path to cool parts there-along at all times during use, and altering the gas flow path according to the proximity of the manipulator to the surface and using the effects of the alteration of the gas flow path to control the manipulator.

8. The method of claim 7 characterized by discharging the flow of air from the sensor in the direction of the surface.

9. The method of claim 8 characterized by altering the flow path to increase the flow of air through the sensor when it is sensing the proximity of the surface.

* * * * *